(12) United States Patent
Lien

(10) Patent No.: US 10,966,559 B2
(45) Date of Patent: Apr. 6, 2021

(54) MULTIFUNCTIONAL JUICING NET STRUCTURE OF JUICING DEVICE

(71) Applicants: Chin Jui Lien, Taichung (TW); Yi Wang Kuo, New Taipei (TW)

(72) Inventor: Chin Jui Lien, Taichung (TW)

(73) Assignees: Chin Jui Lien, Taichung (TW); Yi Wang Kuo, New Taichung (TW)

( * ) Notice: Subject to any disclaimer, the term of this patent is extended or adjusted under 35 U.S.C. 154(b) by 353 days.

(21) Appl. No.: 16/209,012

(22) Filed: Dec. 4, 2018

(65) Prior Publication Data
US 2020/0146495 A1    May 14, 2020

(30) Foreign Application Priority Data
Nov. 13, 2018 (TW) ................................ 107215381

(51) Int. Cl.
  *A47J 19/02* (2006.01)
  *A47J 19/06* (2006.01)
  *A23N 1/02* (2006.01)

(52) U.S. Cl.
  CPC .............. *A47J 19/023* (2018.08); *A23N 1/02* (2013.01); *A47J 19/025* (2013.01); *A47J 19/06* (2013.01); *A47J 19/027* (2013.01)

(58) Field of Classification Search
  CPC .......... A23N 1/02; A47J 19/025; A47J 19/027

USPC ........................................... 99/509, 510, 513
See application file for complete search history.

(56) References Cited

U.S. PATENT DOCUMENTS

2017/0231414 A1*  8/2017  Moon .................... A47J 19/025
                                                                                99/492

FOREIGN PATENT DOCUMENTS

| CA | 2916106 A1 * | 12/2014 | ............ A47J 19/027 |
| WO | WO-2015161815 A1 * | 10/2015 | ............ A47J 19/025 |
| WO | WO-2016017949 A1 * | 2/2016 | ............. A47J 19/00 |

* cited by examiner

*Primary Examiner* — Reginald Alexander
(74) *Attorney, Agent, or Firm* — Wang Law Firm, Inc.

(57) ABSTRACT

A multifunctional juicing net structure of a juicing device includes a juice cup, a juicing net cup, a spiral pushing and extruding body and a feeding cup cover. The juicing net cup is received into the juice cup; the spiral pushing and extruding body is received into the juicing net cup, and the feeding cup cover is covered onto the juice cup. The juice cup and the juicing net cup are provided for juicing and filtering food residue and make selective adjustments according to different squeeze food to achieve the effect of separating the juice and the residue during a juicing process. No dead spot exists after the juicing net cup is detached from the juice cup to facilitate the cleaning and preventing the residue from being stuck at the corners during the cleaning process, so as to achieve the effects of good functionality and high convenience.

6 Claims, 6 Drawing Sheets

MULTIFUNCTIONAL JUICING NET STRUCTURE OF JUICING DEVICE

FIELD OF THE INVENTION

The present invention relates to a multifunctional juicing net structure, and more particularly to the multifunctional juicing net structure used in a juicing device.

BACKGROUND OF THE INVENTION

With reference to FIG. 6 for a conventional juicing device, the conventional juice device has a squeeze tube assembly 50 including a squeeze tube 51 and a squeeze device 52, and the squeeze tube 51 has an inlet 510, an outlet 511, and a plurality of juice output holes 512 formed on the sidewall of the squeeze tube 51, and the squeeze device 52 is installed in the squeeze tube 51, and the squeeze tube 51 is installed onto a juice container 53. When the squeeze device 52 is operated, a fruit is entered into the inlet 510 formed at the top of the squeeze tube 51, and the squeeze device 52 squeezes and presses the fruit in the squeeze tube 51, and the fruit juice flows from the juice output hole 512 into the juice container 53 (not shown in the figure), and the fruit residue is discharged from the outlet 511 which is formed at the bottom of the squeeze tube 51 to achieve the effect of separating the juice and the residue, but the size of the juice output hole 512 of the squeeze tube 51 of the squeeze tube assembly 50 is fixed. When fruits with different fiber textures are squeezed, the fruit with finer fibers will not be squeezed completely, the fruit fibers together with the fruit juice are discharged from the juice output hole 512. The fruit residue produced after the squeezing may be remained at the surrounding of the juice output hole 512, and thus making the use and cleaning inconvenient. Obviously, further improvements are required.

In view of the aforementioned drawbacks of the prior art, the inventor of the present invention based on years of experience to conduct extensive research and experiment, and finally provided a feasible solution to overcome the drawbacks of the prior art.

SUMMARY OF THE INVENTION

Therefore, it is a primary objective of the present invention to overcome the drawbacks of the conventional juicing device with poor squeezing and inconvenient cleaning effects by providing a multifunctional juicing net structure of a juicing device in accordance with the present invention.

To achieve the aforementioned and other objectives, the present invention provides a multifunctional juicing net structure of a juicing device, comprising: a juice cup, a juicing net cup, a spiral pushing and extruding body and a feeding cup cover, characterized in that the juice cup has an inner cup portion, a residue outlet and a juice outlet disposed therein, a positioning seat disposed at the center of the bottom of the inner cup portion, and two residue stop ribs and a residue discharge opening disposed at the trisection-point positions around the periphery of the positioning seat respectively, and the residue discharge opening is communicated with the residue outlet, and the inner cup portion has an inner peripheral sidewall around the periphery of the inner cup portion, and the inner peripheral sidewall is communicated with the juice outlet, and the inner peripheral sidewall has an upper sidewall and a lower sidewall, and a juice-stop rib block is disposed at the interval between the two residue stop ribs disposed on the positioning seat of the upper sidewall and the residue discharge opening, and a first juicing rib is installed at the positions of the lower sidewall relative to the bottom of the juice-stop rib block and the juice outlet separately, and the lower sidewall has a plurality of second juicing ribs configured to be opposite to the residue stop rib and the residue discharge opening, wherein the first and second juicing ribs have thickness d, and a plurality of cup buckles are formed at an opening of the inner cup portion and two adjacent cup buckles are coupled by a connecting rib, and a shaft seat is disposed at the center of the juicing net cup, and a residue discharge opening is formed at a trisection-point position at the periphery of the shaft seat, and a peripheral sidewall is formed around the juicing net cup, and the peripheral sidewall has an upper peripheral sidewall and a lower peripheral sidewall, and the upper peripheral sidewall has a plurality of grinding ribs disposed at the positions opposite to the residue discharge opening which is configured to be corresponsive to the periphery of the shaft seat, and the lower peripheral sidewall has a plurality of first juicing holes formed relative to the bottom of the grinding rib, and the upper peripheral sidewall has at least two juice discharge nets installed at the interval of the residue discharge opening around the shaft seat, and the lower peripheral sidewall has a second juicing hole formed relative to the bottom of the juice discharge net, and the first and second juicing holes have a width D which is equal to 1 mm~10 mm, and the width D of the first and second juicing holes is greater than the thickness d of the first and second juicing ribs disposed on the lower sidewall of the inner peripheral side wall of the inner cup portion of the juice cup, and a seal ring is disposed at the bottom of the shaft seat, and the spiral pushing and extruding body has a mandrel with an extruding portion spirally disposed on the outer side of the spiral pushing and extruding body, and the feeding cup cover has a feed cover stop rib, a plurality of engaging portions arranged with an interval apart from each other and at the bottom of the feed cover stop rib, and a feed inlet penetrates through the top of the feeding cup cover, and an upper shaft seat is disposed adjacent to the feed inlet, and the juicing net cup is received into the inner cup portion of the juice cup, and a positioning seat is disposed at the shaft seat and the seal ring of the juicing net cup and configured to be relative to the bottom of the inner cup portion of the juice cup, and the plurality of first and second juicing ribs disposed on the lower sidewall of the inner peripheral sidewall of the inner cup portion of the juice cup are inserted into the plurality of first and second juicing holes formed on the lower peripheral sidewall of the juicing net cup, and a filter hole is formed after the plurality of first and second juicing ribs are inserted into the plurality of first juicing holes and second juicing hole, and the two juice discharge nets on the upper peripheral sidewall are configured to be corresponsive to the juice outlet of the juice cup, and the spiral pushing and extruding body is received into the juicing net cup, and a side of the mandrel of the spiral pushing and extruding body is pivotally coupled to the shaft seat and the seal ring of the juicing net cup, and the feeding cup cover is covered onto the juice cup, and the plurality of engaging portions of the feed cover stop rib of the feeding cup cover are engaged and fixed to the plurality of cup buckles which are disposed at the opening of the inner cup portion of the juice cup, and the upper shaft seat disposed adjacent to the feed inlet of the feeding cup cover is pivotally coupled to the other side of the mandrel of the spiral pushing and extruding body. When food is inputted from the feed inlet of the feeding cup cover into the juicing net cup and the spiral pushing and extruding body is driven by a driving force to rotate, the extruding portion of the spiral pushing and extruding body and the plurality of grinding ribs disposed on the upper peripheral sidewall of the juicing net cup extruded and grind the food to produce a juice, and the juice is outputted from the filter hole which is formed between the plurality of first and second juicing ribs of the juice cup and the plurality of first and second juicing holes of the juicing net cup. For the squeeze of a non-fluid food, the juice is outputted from the juice discharge net disposed on the upper peripheral sidewall of the juicing net cup into the juice cup, and the food residue produced after the extrusion and grinding is inputted into the juicing net cup and outputted to the outside through the residue discharge opening of the juice cup, so as to achieve the effect of separating the juice and residue in the juicing process. After the first and second juicing ribs of the juice cup are detached and separated from the first and second juicing holes of the juicing net cup, the whole cleaning process becomes more convenient and easier. No dead spot exists after the juicing net cup is detached from the juice cup to facilitate the cleaning and preventing the residue from being stuck at the corners during the cleaning process, and the juice discharge nets are disposed at the trisection-point positions on the upper peripheral sidewall of the juicing net cup to improve the output of the food squeezed by the juicing net cup, so as to achieve the effects of good functionality and high convenience.

DESCRIPTION OF THE PREFERRED EMBODIMENTS

Figure 1:
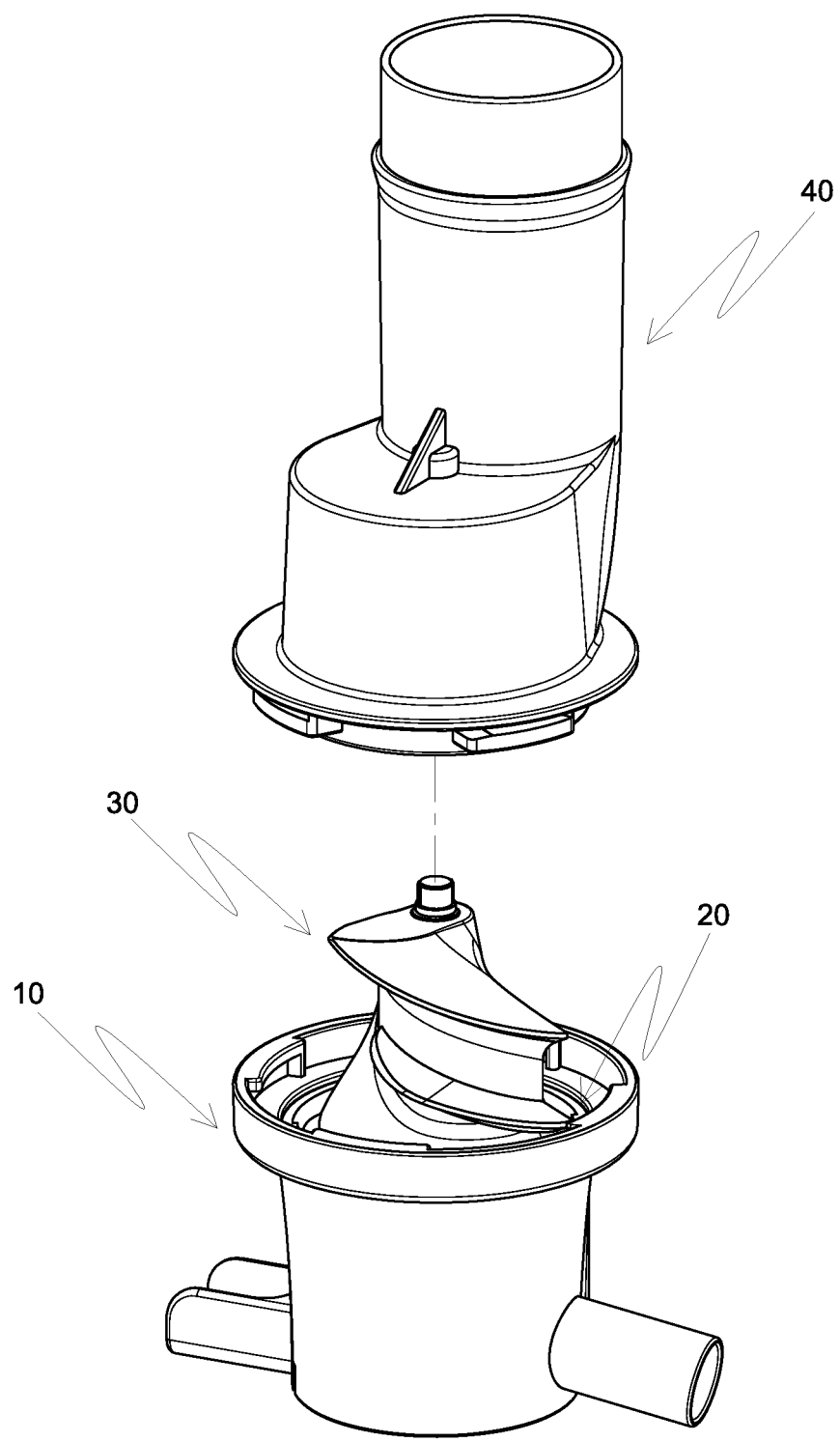
FIG. 1 is a perspective partially-assembled view of a multifunctional juicing net structure of a juicing device in accordance with the present invention.

The technical contents of the present invention will become apparent with the detailed description of preferred embodiments accompanied with the illustration of related drawings as follows. It is intended that the embodiments and figures disclosed herein are to be considered illustrative rather than restrictive.

With reference to FIGS. 1 to 4 for a perspective partially-assembled view, an exploded view, and a cross-sectional side view of a multifunctional juicing net structure of a juicing device and another exploded view of a juice cup and a juicing net cup in accordance with the present invention respectively, the multifunctional juicing net structure comprises:

a juice cup 10, having an inner cup portion 11, a residue outlet 12 and a juice outlet 13 therein, a positioning seat 110 disposed at the center of the bottom of the inner cup portion 11, two residue stop ribs 110A and a residue discharge opening 110B disposed at the trisection-point positions of the periphery of the positioning seat 110, and the residue discharge opening 110B being communicated with the residue outlet 12, and the inner cup portion 11 having an inner peripheral sidewall 111 disposed around the inner cup portion 11, and the inner peripheral sidewall 111 being communicated with the juice outlet 13, and the inner peripheral sidewall 111 having an upper sidewall 111A and a lower sidewall 111B, and a juice-stop rib block S1 being disposed at an interval between the two residue stop ribs 110A and residue discharge opening 110B which are formed on the upper sidewall 111A and configured to be corresponsive to the periphery of the positioning seat 110, and the juice-stop rib block S1 has a first juicing rib R1 configured to be corresponsive to the lower sidewall 111B and the position of the juice outlet 13, and the lower sidewall 111B has a plurality of second juicing ribs R2 configured to be relative to the residue stop rib 110A and the residue discharge opening 110B, wherein the first and second juicing ribs R1, R2 have a thickness d, and the opening of the inner cup portion 11 has a plurality of cup buckles 112, and the plurality of cup buckles 112 are coupled to one another by a connecting rib 112A;

a juicing net cup 20, having a shaft seat 21 disposed at the center of the juicing net cup 20, a residue discharge opening 210 formed at the trisection-point position of the periphery of the shaft seat 21, and a peripheral sidewall 22 disposed around the juicing net cup 20, and the peripheral sidewall 22 having an upper peripheral sidewall 220 and a lower peripheral sidewall 221, and the upper peripheral sidewall 220 having a plurality of grinding ribs 220A disposed at the relative positions of the residue discharge opening 210 around the shaft seat 21, and the lower peripheral sidewall 221 having a plurality of first juicing holes 221A formed at the bottom thereof and relative to the grinding ribs 220A respectively, and the upper peripheral sidewall 220 having at least two juice discharge nets 220B arranged with an interval apart from each other and disposed at the residue discharge opening 210 around the shaft seat 21, and the lower peripheral sidewall 221 having a second juicing hole 221B formed thereon and relative to the bottom of the juice discharge net 220B, wherein the first juicing hole 221A and the second juicing hole 221B have a width D equal to 1 mm~10 mm, and the width D of the first juicing hole 221A and the second juicing hole 221B is greater than juice cup the thickness d of the first and second juicing ribs R1, R2 disposed on the lower sidewall 111B of the inner peripheral sidewall 111 of the inner cup portion 11, and a seal ring 23 is disposed at the bottom of the shaft seat 21, and the juicing net cup 20 is received into the inner cup portion 11 of the juice cup 10, and a positioning seat 110 is disposed at the shaft seat 21 and the seal ring 23 and configured to be relative to the bottom of the inner cup portion 11, and a filter hole is formed after the plurality of first juicing ribs R1 and second juicing rib R2 disposed on the lower sidewall 111B of the inner peripheral sidewall 111 of the inner cup portion 11 are inserted into the plurality of first juicing holes 221A and second juicing hole 221B formed on the lower peripheral sidewall 221 respectively, and the two juice discharge nets 220B disposed on the upper peripheral sidewall 220 are selectively configured to be corresponsive to the juice outlet 13 of the juice cup 10;

a spiral pushing and extruding body 30, having a mandrel 31, and an extruding portion 32 spirally formed on the outer side of the spiral pushing and extruding body 30, and the spiral pushing and extruding body 30 being received into the juicing net cup 20, and a side of the mandrel 31 being positioned and pivotally coupled to the shaft seat 21 and the seal ring 23 of the juicing net cup 20; and a feeding cup cover 40, having a feed cover stop rib 41, a plurality of engaging portions 410 arranged with an interval apart from one another and disposed at the bottom of the feed cover stop rib 41, a feed inlet 42 penetrating through the top of the feeding cup cover 40, and an upper shaft seat 420 disposed adjacent to the feed inlet 42, and the feeding cup cover 40 being covered onto the juice cup 10, and the plurality of engaging portions 410 of the feed cover stop rib 41 being engaged and fixed to the plurality of cup buckles 112 disposed at the opening of the inner cup portion 11 of the juice cup 10, and the upper shaft seat 420 disposed adjacent to the feed inlet 42 being pivotally coupled to the other side of the mandrel 31 of the spiral pushing and extruding body 30.

With the aforementioned structure, a multifunctional juicing net structure of a juicing device in accordance with the present invention is produced.

Figure 2:
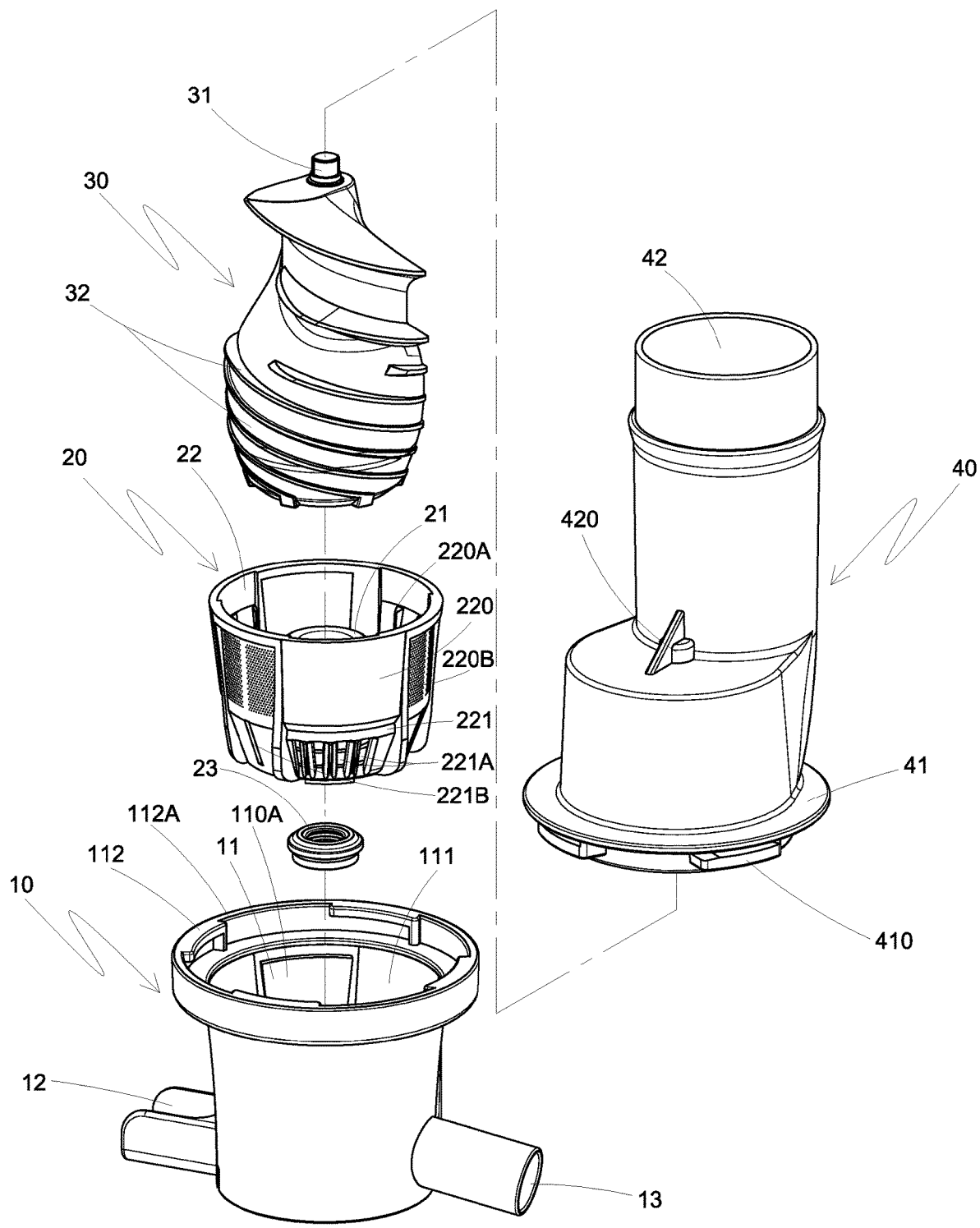
FIG. 2 is an exploded view of a multifunctional juicing net structure of a juicing device in accordance with the present invention.
Figure 3:
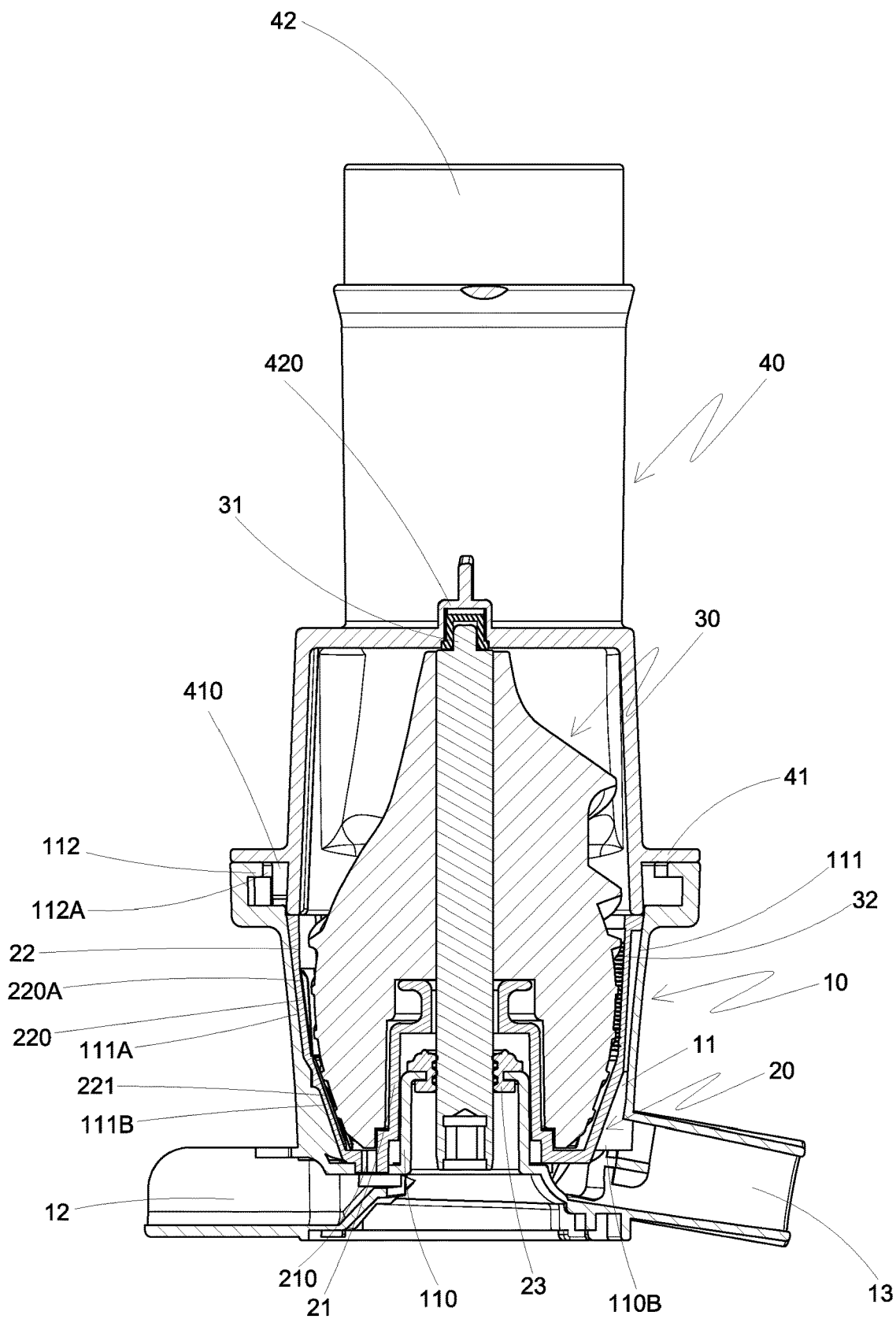
FIG. 3 is a cross-sectional side view of a multifunctional juicing net structure of a juicing device in accordance with the present invention.
Figure 4:
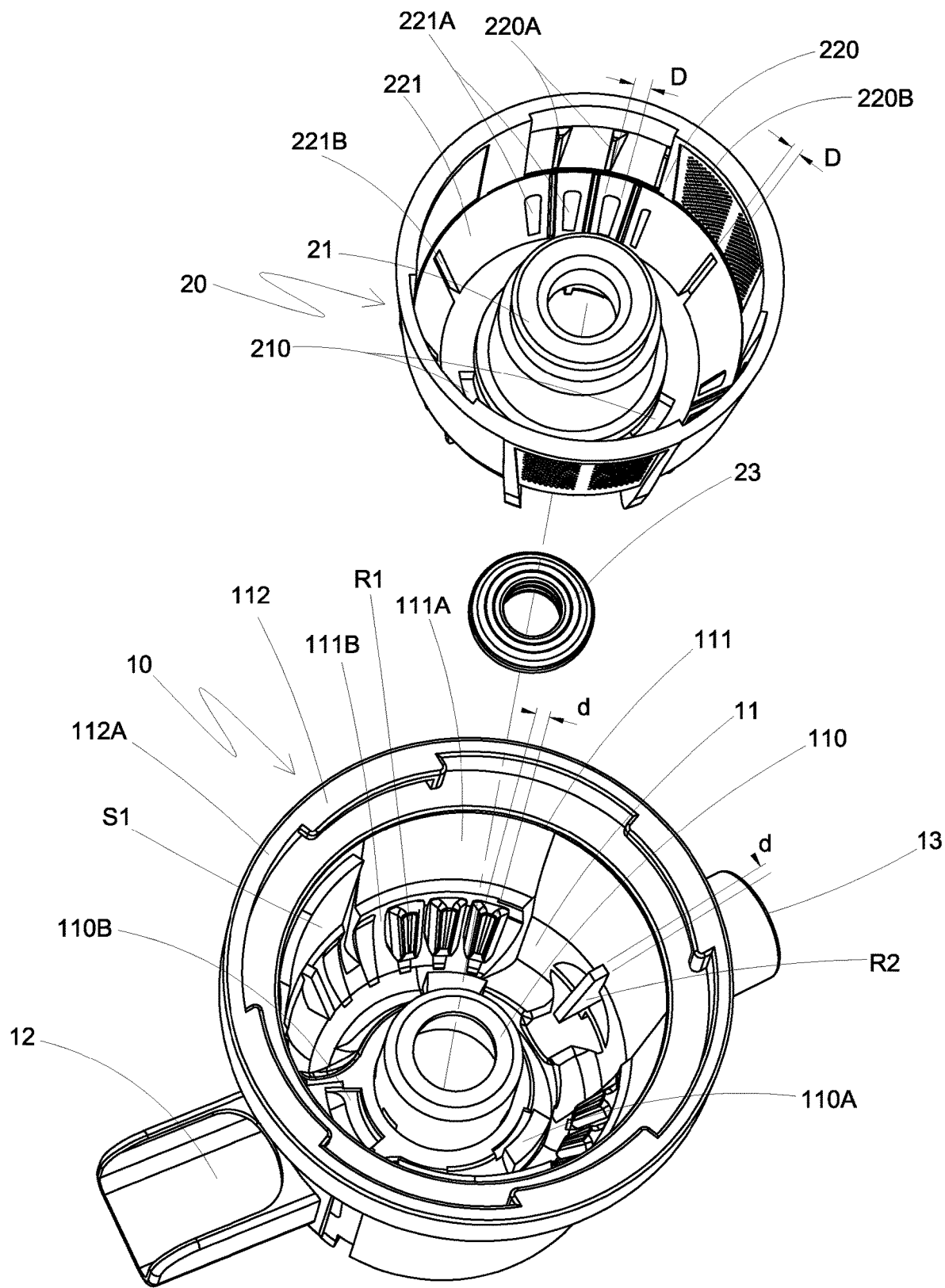
FIG. 4 is another exploded view of a multifunctional juicing net structure of a juicing device in accordance with the present invention

With reference to FIGS. 2 to 4 for the exploded view and cross-sectional side view of a juicing device of the present invention and the other exploded view of a juice cup and a juicing net cup of the present invention respectively, the juicing net cup 20 is received into the inner cup portion 11 of the juice cup 10, and a positioning seat 110 is disposed at the bottom of the shaft seat 21 and seal ring 23 of the juicing net cup 20 and configured to be relative to the bottom of the inner cup portion 11 of the juice cup 10. After the plurality of first juicing ribs R1 and second juicing ribs R2 disposed on the lower sidewall 111B of the inner peripheral sidewall 111 of the inner cup portion 11 of the juice cup 10 are inserted into the plurality of first juicing holes 221A and second juicing hole 221B formed on the lower peripheral sidewall 221 of the juicing net cup 20, a filter hole is formed after the plurality of first juicing ribs R1 and second juicing rib R2 are inserted into the plurality of first juicing holes 221A and second juicing holes 221B, and the two juice discharge nets 220B of the upper peripheral sidewall 220 are selectively configured to be corresponsive to the juice outlet 13 of the juice cup 10, and the spiral pushing and extruding body 30 is received into the juicing net cup 20, and a side of the mandrel 31 of the spiral pushing and extruding body 30 is pivotally coupled to the shaft seat 21 and the seal ring 23 of the juicing net cup 20, and the feeding cup cover 40 is covered ono the juice cup 10, and the plurality of engaging portions 410 of the feed cover stop rib 41 of the feeding cup cover 40 are engaged and fixed to the plurality of cup buckles 112 disposed at the opening of the inner cup portion 11 of the juice cup 10, and the upper shaft seat 420 disposed adjacent to the feed inlet 42 of feeding cup cover 40 is pivotally coupled to the other side of the mandrel 31 of the spiral pushing and extruding body 30. When food is inputted from the feed inlet 42 of the feeding cup cover 40 into the juicing net cup 20 and the spiral pushing and extruding body 30 is driven by a driving force to rotate, the extruding portion 32 of the spiral pushing and extruding body 30 and the plurality of grinding ribs 220A on the upper peripheral sidewall 220 of the juicing net cup 20 extrude and grind the food to produce a juice, wherein the juice is outputted from the plurality of first juicing ribs R1 and second juicing rib R2 of the juice cup 10 and out of the filter hole formed between the plurality of first juicing holes 221A and second juicing holes 221B of the juicing net cup 20 into the juice cup 10. For the squeeze of non-fluid food, the juice is outputted from the juice discharge net 220B on the upper peripheral sidewall 220 of the juicing net cup 20 into the juice cup 10, and the food residue produced after the extrusion and grinding process is outputted from the residue discharge opening 210 of the juicing net cup 20 and outputted to the outside through the residue discharge opening 110B of the juice cup 10 to achieve the effect of separating the juice and residue effectively in the juicing process. In addition, after the first juicing rib R1 and second juicing rib R2 of the juice cup 10 are detached and separated from the first juicing hole 221A and second juicing hole 221B of the juicing net cup 20, the overall cleaning becomes more convenient and easier, and no dead corner exists in the first juicing hole 221A and second juicing hole 221B to prevent residue from being stuck in the dead corners during the cleaning process, so as to improve the functionality and convenience.

Figure 5:
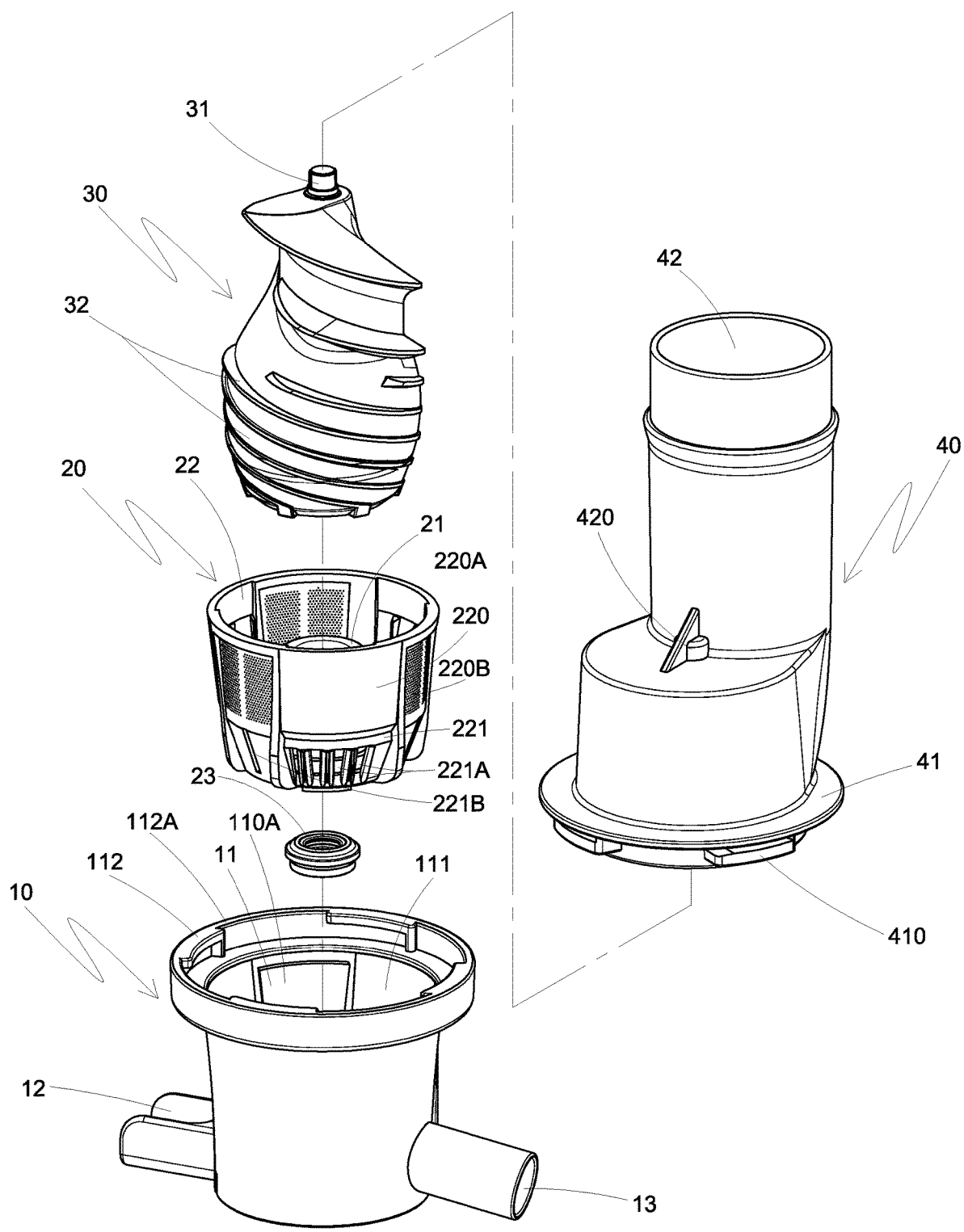
FIG. 5 is an exploded view of a multifunctional juicing net structure of a juicing device having a juicing net cup with a plurality of juicing nets arranged with an interval apart from each other in accordance with an embodiment of the present invention.
Figure 6:
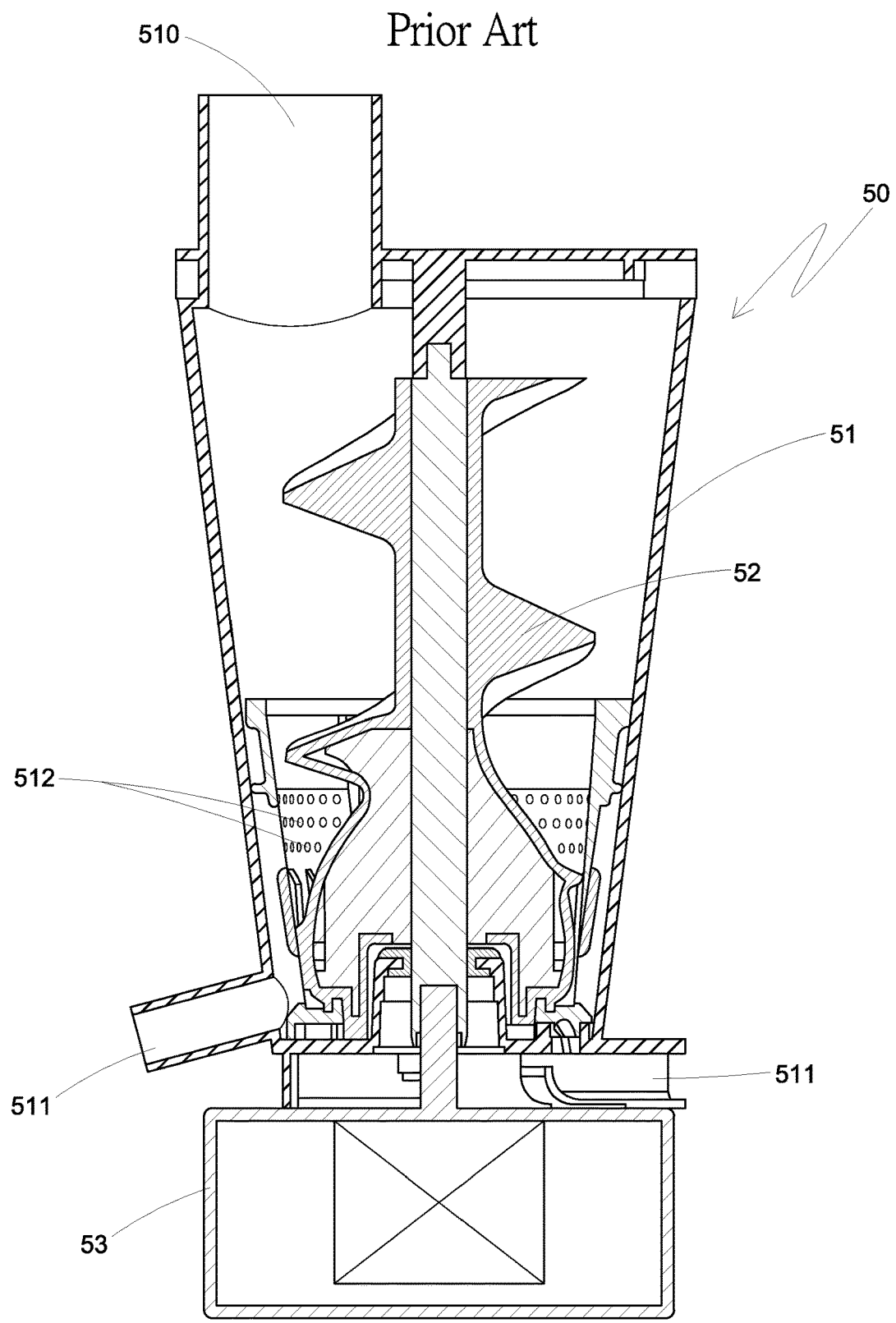
FIG. 6 is a schematic view of a conventional multifunctional juicing net structure of a juicing device.

With reference to FIG. 5 for an exploded view of a multifunctional juicing net structure of a juicing device having a juicing net cup with a plurality of juicing nets arranged with an interval apart from each other in accordance with an embodiment of the present invention, the overall structure is substantially the same as those as shown in FIGS. 1 to 5 of the present invention, except that the juice discharge net 220B on the upper peripheral sidewall 220 of the juicing net cup 20 is designed at the trisection-point position to increase the output of the food squeezed by the juicing net cup 20, so as to improve the multifunctional application of the present invention.

While the present invention has been described by means of specific embodiments, numerous modifications and variations could be made thereto by those skilled in the art without departing from the scope and spirit of the present invention set forth in the claims.

What is claimed is:

1. A multifunctional juicing net structure of a juicing device, comprising:

a juice cup, having an inner cup portion, a residue outlet and a juice outlet disposed therein, a positioning seat disposed at the center of the inner cup portion, two residue stop ribs and a residue discharge opening disposed at the trisection-point position of the periphery of the positioning seat, and the residue discharge opening being communicated with the residue outlet, an inner peripheral sidewall disposed around the inner cup portion and communicated with the juice outlet, and the inner peripheral sidewall having an upper sidewall and a lower sidewall, and a juice-stop rib block formed at the gap between the two residue stop ribs disposed around the positioning seat and configured to be corresponsive to the upper sidewall and the residue discharge opening, and a first juicing rib being disposed at the position of the lower sidewall relative to the bottom of the juice-stop rib block and the position of the and juice outlet separately, and a plurality of second juicing ribs disposed at the positions of the lower sidewall which are opposite to the residue stop rib and the residue discharge opening; a juicing net cup, having a shaft seat disposed at the center thereof, a residue discharge opening formed at the trisection-point positions around the shaft seat separately, and a peripheral sidewall formed around the periphery of the juicing net cup, and the peripheral sidewall having an upper peripheral sidewall and a lower peripheral sidewall, and the upper peripheral sidewall having a plurality of grinding ribs installed at the positions opposite to the residue discharge openings around the periphery of the shaft seat respectively, and the lower peripheral sidewall having a plurality of first juicing holes formed relative to the bottom thereof and the grinding ribs respectively, and the upper peripheral sidewall having at least two juice discharge nets disposed at the intervals between the residue discharge openings around the shaft seat, and the lower peripheral sidewall having a second juicing hole formed relative to the bottom of the juice discharge net, and a seal ring being disposed at the bottom of the shaft seat, and the juicing net cup being received into the inner cup portion of the juice cup, and the positioning seat of the shaft seat and seal ring being configured to be opposite to the bottom of the inner cup portion, and the plurality of first juicing ribs and second juicing rib disposed on the lower sidewall of the inner peripheral sidewall of the inner cup portion being inserted into the plurality of first and second juicing holes of the lower peripheral sidewall respectively, and a filter hole being formed at the gap produced after the plurality of first and second juicing ribs are inserted into the plurality of first and second juicing holes, and the juice discharge net being selectively configured to be corresponsive to the juice outlet of the juice cup.

2. The multifunctional juicing net structure of a juicing device according to claim 1, wherein the first and second juicing holes formed on the lower peripheral sidewall of the peripheral sidewall of the juicing net cup have a width D, and the first and second juicing ribs disposed on the lower side wall of the inner periphery sidewall of the inner cup portion of the juice cup have a thickness d, and the width D of the first and second juicing holes is greater than the thickness d of the first and second juicing ribs.

3. The multifunctional juicing net structure of a juicing device according to claim 2, wherein the first and second juicing holes have a width D equal to 1 mm~10 mm.

4. The multifunctional juicing net structure of a juicing device according to claim 1, wherein the juicing net cup further comprises a spiral pushing and extruding body disposed therein, and the spiral pushing and extruding body has a mandrel, and an extruding portion spirally formed on the outer side of the spiral pushing and extruding body, and the spiral pushing and extruding body is received into the juicing net cup, and a side of the mandrel is positioned and pivotally coupled to the shaft seat and the seal ring of the juicing net cup; and the juice cup further comprised a feeding cup cover covered thereon, to feed inlet penetrating through the top of the feeding cup cover, and an upper shaft seat disposed adjacent to the feed inlet, and the feeding cup cover is covered onto the juice cup, and the upper shaft seat and the other side of the spiral pushing and extruding body are pivotally coupled to the mandrel.

5. The multifunctional juicing net structure of a juicing device according to claim 4, wherein the juice cup has a plurality of cup buckles disposed at the opening of the inner cup portion of the juice cup, and coupled by a connecting rib, and the feeding cup cover has a feed cover stop rib, and a plurality of engaging portions arranged with an interval apart with each other and disposed at the bottom of the feed cover stop rib, and the plurality of engaging portions of the feed cover stop rib are engaged and fixed to the plurality of cup buckles formed at the opening of the inner cup portion of the juice cup.

6. The multifunctional juicing net structure of a juicing device according to claim 1, wherein the juice discharge net disposed on the upper peripheral sidewall of the juicing net cup is installed at a trisection-point position, and the juice discharge net is selectively installed at the juice outlet configured to be corresponsive to the juice cup.

* * * * *